United States Patent
Chakirov

(10) Patent No.: US 11,604,535 B2
(45) Date of Patent: *Mar. 14, 2023

(54) DEVICE AND METHOD FOR PROCESSING USER INPUT

(71) Applicant: HUAWEI TECHNOLOGIES CO., LTD., Guangdong (CN)

(72) Inventor: Martin Chakirov, Trelleborg (SE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/336,602

(22) Filed: Jun. 2, 2021

(65) Prior Publication Data
US 2021/0357067 A1 Nov. 18, 2021

Related U.S. Application Data

(63) Continuation of application No. 14/844,762, filed on Sep. 3, 2015, now Pat. No. 11,029,778, which is a
(Continued)

(51) Int. Cl.
| | |
|---|---|
| *G06F 3/041* | (2006.01) |
| *G06F 3/0488* | (2022.01) |
| *G06F 3/04883* | (2022.01) |

(52) U.S. Cl.
CPC .......... *G06F 3/0416* (2013.01); *G06F 3/041* (2013.01); *G06F 3/0488* (2013.01); *G06F 3/04883* (2013.01)

(58) Field of Classification Search
CPC ............... G06F 3/041; G06F 3/0412; G06F 2203/04105; G06F 3/016; G06F 3/044;
(Continued)

(56) References Cited

U.S. PATENT DOCUMENTS

| | | | |
|---|---|---|---|
| 7,996,792 B2 * | 8/2011 | Anzures | H04M 3/53333 715/702 |
| 9,665,178 B2 | 5/2017 | Bukurak et al. | |

(Continued)

OTHER PUBLICATIONS

Communication Pursuant to Article 94(3) EPC issued in European Application No. 12166239.9 dated Jun. 23, 2015, 6 pages.
(Continued)

*Primary Examiner* — Olga V Merkoulova
(74) *Attorney, Agent, or Firm* — Fish & Richardson P.C.

(57) ABSTRACT

A method for generating display data comprises detecting user input via an input interface. A processor is in communication with the input interface to generate display data comprising a display object for display by a display device. The display object is representative of an action that will subsequently be performed by the processor on continuation of the user input. The display data on the display device is output whilst the user input is being detected. Alternatively, the display object is caused to appear on the display device over time as the user input is being performed, wherein the rate at which the display object appears is different to the rate of performance of the user input. A device and executable computer program for performing the steps of the method is also provided.

18 Claims, 9 Drawing Sheets

Related U.S. Application Data continuation of application No. 13/551,226, filed on Jul. 17, 2012, now Pat. No. 9,128,598, which is a continuation of application No. 13/460,270, filed on Apr. 30, 2012, now Pat. No. 9,772,700.

(58) Field of Classification Search
CPC . G06F 3/04815; G06F 1/1652; G06F 3/03545
See application file for complete search history.

(56) References Cited

U.S. PATENT DOCUMENTS

| | | | |
|---|---|---|---|
| 9,916,081 B2* | 3/2018 | Zhu | G06F 3/04883 |
| 10,732,814 B2* | 8/2020 | Ording | G06F 3/0481 |
| 10,732,821 B2* | 8/2020 | Platzer | H04M 1/72466 |
| 11,029,778 B2* | 6/2021 | Chakirov | G06F 3/041 |
| 2003/0151538 A1* | 8/2003 | Escobosa | H04N 21/42225 340/13.24 |
| 2004/0078309 A1* | 4/2004 | Norquist | G06Q 40/00 705/35 |
| 2005/0134578 A1 | 6/2005 | Chambers et al. | |
| 2006/0026535 A1 | 2/2006 | Hotelling et al. | |
| 2006/0026536 A1 | 2/2006 | Hotelling et al. | |
| 2006/0125803 A1* | 6/2006 | Westerman | G06F 3/04883 345/173 |
| 2006/0292537 A1* | 12/2006 | Nute | G09B 5/06 434/307 A |
| 2007/0150826 A1 | 6/2007 | Anzures et al. | |
| 2007/0220444 A1* | 9/2007 | Sunday | G06F 3/0488 715/788 |
| 2007/0278320 A1 | 12/2007 | Lunacek et al. | |
| 2008/0036743 A1 | 2/2008 | Westerman et al. | |
| 2008/0167070 A1 | 7/2008 | Ishii et al. | |
| 2008/0174570 A1 | 7/2008 | Jobs et al. | |
| 2008/0316183 A1* | 12/2008 | Westerman | G06F 3/04883 345/173 |
| 2009/0064055 A1 | 3/2009 | Chaudhri et al. | |
| 2009/0157697 A1 | 6/2009 | Conway et al. | |
| 2009/0158149 A1* | 6/2009 | Ko | G06F 3/04886 715/702 |
| 2009/0174677 A1* | 7/2009 | Gehani | G06F 3/04883 345/173 |
| 2010/0048241 A1 | 2/2010 | Seguin et al. | |
| 2010/0313158 A1 | 12/2010 | Lee et al. | |
| 2011/0210926 A1 | 9/2011 | Pasquero et al. | |
| 2011/0235990 A1 | 9/2011 | Anzures et al. | |
| 2011/0252381 A1 | 10/2011 | Chaudhri | |
| 2012/0081530 A1 | 4/2012 | Kerr et al. | |
| 2012/0159380 A1 | 6/2012 | Kocienda | |
| 2012/0162093 A1 | 6/2012 | Buxton et al. | |
| 2012/0197419 A1 | 8/2012 | Dhruv et al. | |
| 2013/0179812 A1 | 7/2013 | BianRosa et al. | |
| 2013/0285932 A1 | 10/2013 | Chakirov | |
| 2013/0286035 A1 | 10/2013 | Chakirov | |
| 2014/0033025 A1* | 1/2014 | Mukherjee | H04N 21/47217 715/246 |
| 2014/0115480 A1 | 4/2014 | Lundgren et al. | |
| 2015/0113407 A1 | 4/2015 | Hoffert et al. | |
| 2015/0378462 A1 | 12/2015 | Chakirov | |

OTHER PUBLICATIONS

Communication under Rule 71(3) EPC issued in European Application No. 12166239.9 dated Oct. 14, 2016.
Examination Report issued in Canadian Application No. 2873555 dated Feb. 8, 2019, 5 pages.
Extended European Search Report in European Application No. 12166239.9, dated Aug. 24, 2012, 6 pages.
Notice of Allowance issued in Canadian Application No. 2873555 dated Dec. 8, 2020, 1 page.
Office Action issued in Canadian Application No. 2873555 dated Feb. 10, 2020, 3 pages.
Summons to Attend Oral Proceedings issued in European Application No. 12166239.9 dated Jan. 22, 2016.

* cited by examiner

FIG. 6A(ii)

FIG. 6A(iv)
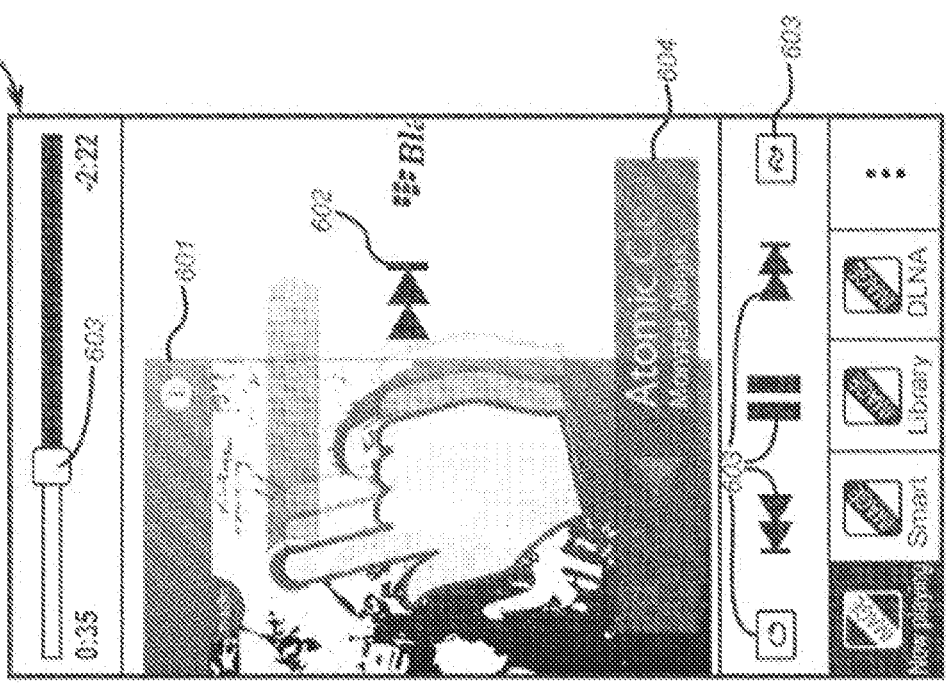
FIG. 6A(iii)

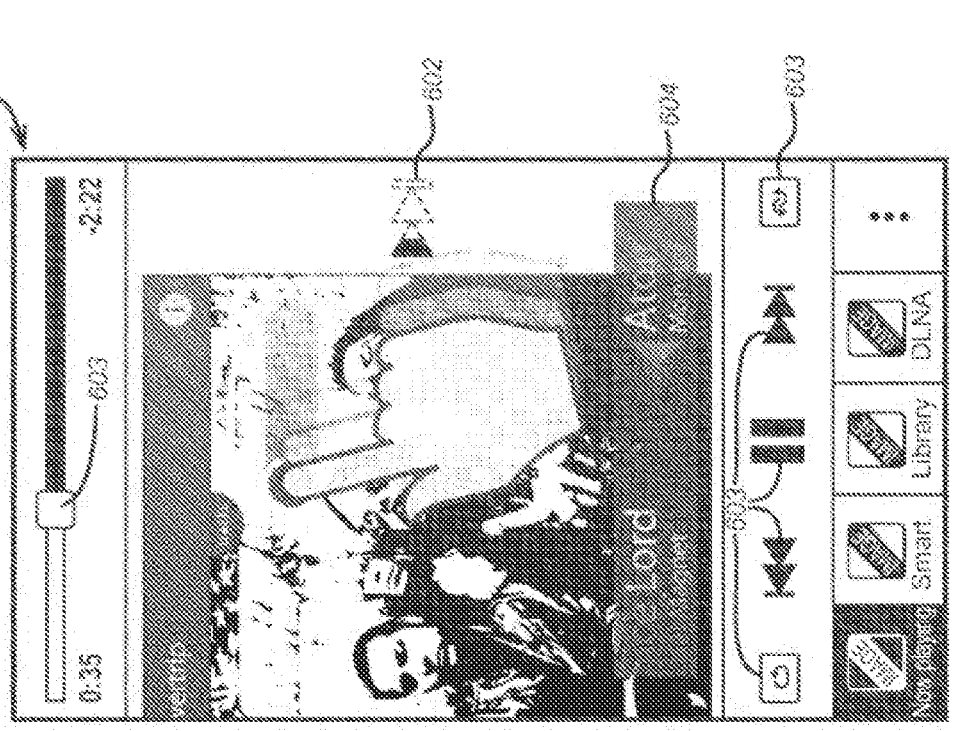

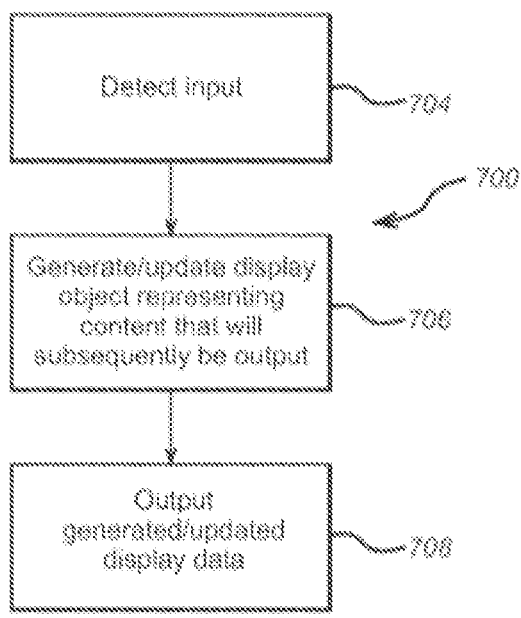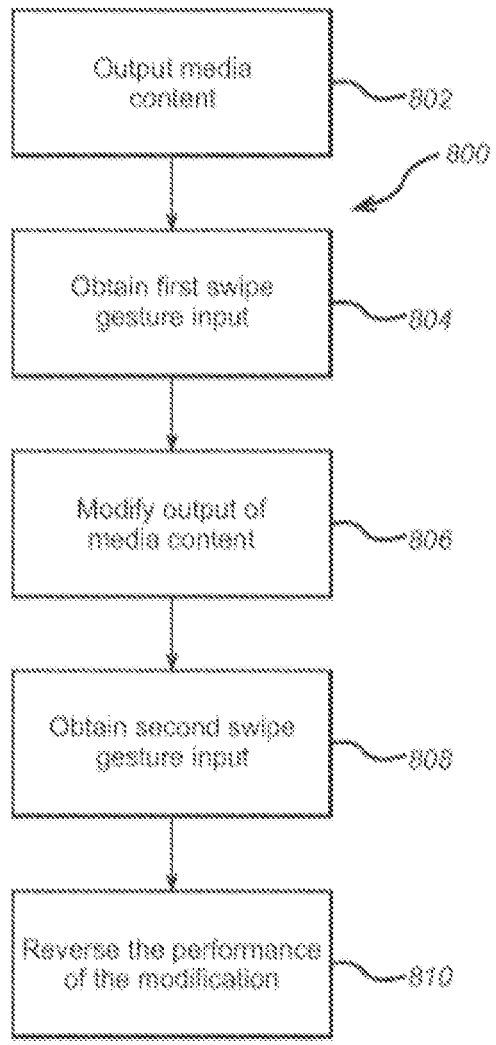

DEVICE AND METHOD FOR PROCESSING USER INPUT

CROSS-REFERENCE TO RELATED APPLICATION

This application is a continuation of U.S. patent application Ser. No. 14/844,762 filed on Sep. 3, 2015, now U.S. Pat. No. 11,029,778. The U.S. patent application Ser. No. 14/844,762 is a continuation of U.S. patent application Ser. No. 13/551,226, filed Jul. 17, 2012, now U.S. Pat. No. 9,128,598. The U.S. patent application Ser. No. 13/551,226 is a continuation of U.S. patent application Ser. No. 13/460,270, filed Apr. 30, 2012, now U.S. Pat. No. 9,772,700. All of the aforementioned applications are hereby incorporated by reference in their entireties.

TECHNICAL FIELD

The embodiments disclosed herein relate to a device, system and method for generating d+-isplay data.

BACKGROUND

Electronic devices may increasingly be controlled using a wide variety of input types. For example, gesture-based user interfaces enable a user to control the device using gestures such as swipes across a touchscreen interface. However, a common problem found with such user interfaces is how to inform a user of the inputs required to interact with and control the device. Users unaware of the required inputs will not be able to interact effectively with the device and may accidentally activate input commands resulting in undesired actions being performed by the device.

Furthermore, precise input commands such as selection of discreet icons or buttons requires a level of precision that is beyond the capabilities of users who are unfamiliar with such user interfaces, unable to view or concentrate on the screen, or unable to execute the required motions with the necessary precision.

BRIEF DESCRIPTION OF THE DRAWINGS

The present disclosure and the embodiments set out herein can be better understood with reference to the description of the embodiments set out below, in conjunction with the appended drawings which are:

FIG. 7 is a flow diagram showing a method for generating display data; and

FIG. 8 is a flow diagram showing a method for modifying the output of media content.

DETAILED DESCRIPTION

Figure 1:
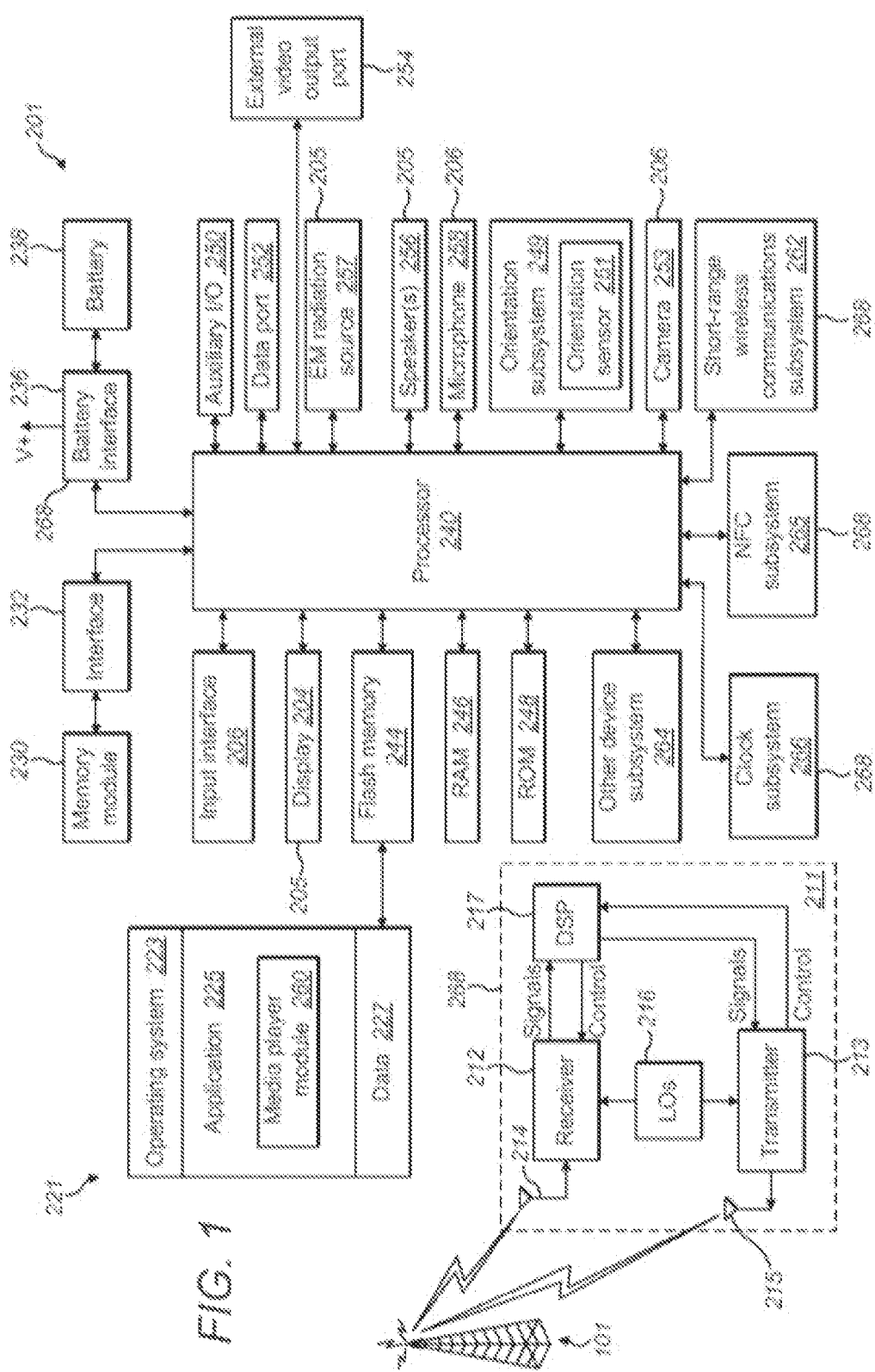
FIG. 1 is a schematic diagram illustrating components of an exemplary electronic device usable by a user in some embodiments.

In a first aspect, there is provided a method for generating display data. The method comprises detecting user input via an input interface, the user input comprising a first input; and operating a processor in communication with the input interface to generate display data comprising a display object for display by a display device, wherein the display object is representative of an action that will subsequently be performed by the processor on completion of the first input; and operating the processor to output the display data on the display device whilst a common initial input of the first input is being detected.

In one example, the first input comprises a first additional input which is detectable by the processor after the common initial input. As discussed below in more detail, the common initial input may comprise a swipe gesture across a touchscreen interface performed using a finger or stylus and the first additional input may comprise removing the finger or stylus from the touchscreen interface. In general, the first additional input may simply be the step that completes the first input at the end of the common initial input.

The display object may be representative of the first additional input which must be detected by the processor for it to determine that the user input comprises the first input.

The user input may comprise a second input, in response to which the processor does not perform the action, the second input also comprising the common initial input.

In addition to the common initial input, the second input may also comprise a second additional input which is detectable by the processor after the common initial input, wherein the first additional input and the second additional input are different.

The processor may further operate to determine whether completion of the first input has occurred; and perform the action only if completion of the first input is detected. For example, if the processor detects the common initial input and the first additional input, the processor determines that the first input has been completed and the action will be performed by the processor. On the other hand, if the processor detects that the common initial input and the second additional input, the processor determines the second user input and that the first user input has not been completed, in which case, the processor does not perform the action.

The processor may generate the display data in such a way that the display object is caused to appear on the display device as the common initial input is being performed, wherein the rate at which the display object appears is different to the rate of detection of the common initial input. The rate at which the display object appears may be greater (i.e. faster) that the rate of performance of the common initial input. This permits a user to acquire additional information concerning their action when providing user input which might not otherwise be available if the information were to appear on the display at the same rate as the user input is performed.

The display object may be representative of an extent of completion of the common initial input. The display object may additionally be representative of an extent of completion of the first input.

The action may correspond to selection of media content, such as audio or video content, in which case the processor outputs the media content. In this case, the display object may be representative of the media content.

The user interface may be a touchscreen interface, the user input comprise a swipe gesture across the touchscreen interface, and the action comprise modifying a current output of media content, for example, by pausing output of the media content.

In a second aspect, there is provided a method for generating display data, the method comprising detecting user input via an input interface, the user input comprising a first input; and operating a processor in communication with the input interface to: generate display data comprising a display object for display by a display device, wherein the display object is representative of content that will subsequently be output on completion of the first user input; and output the display data on the display device whilst a common initial input of the first input is being detected in such a way that the display object is caused to appear on the display device as the user input is being detected, wherein the rate at which the display object appears is different to the rate of detection of the common initial input. For example, the display object may appear at a faster rate than the rate at which the processor detects the user input via the input interface. This permits a user to acquire additional information concerning their action when providing user input which might not otherwise be available if the information were to appear on the display at the same rate as the user input is performed.

In a third aspect, there is provided a method for modifying an output of media content, the method comprising operating a processor to cause an output of media content; detecting user input via a touchscreen interface, the user input comprising a swipe gesture across the touchscreen interface; and operating the processor, responsive to the user input, to cause a first modification of the output of the media content.

The user input may comprise a vertical swipe gesture across the touchscreen interface in a first direction.

The processor may detect second user input via the input interface. The second user input may comprise a vertical swipe gesture across the touchscreen interface in a second direction opposite to the first direction; and the processor may perform the reverse of the first modification in response to the second user input detected.

The first modification may comprise pausing output of the media content.

In a fourth aspect, there is provided a computer-readable medium comprising executable instructions which, when executed, cause the processor to perform the above methods.

In a fifth aspect, there is provided a device for generating display data, the device comprising:

an input interface configured to detect user input, the user input comprising a first input; a processor in communication with the input interface, the processor being configured to: generate display data comprising a display object for display by a display device, wherein the display object is representative of an action that will subsequently be performed by the processor on completion of the first input; and output the display data on the display device whilst a common initial input of the first input is being detected. The device may be an electronic device as described further below.

In one example, the processor is configured to detect if the first input comprises a first additional input which is detectable by the processor after the common initial input.

The processor may be additionally configured to generate the display data such that the display object is representative of the first additional input which must be detected by the processor for it to determine that the user input comprises the first input.

The processor may be additionally configured to determine if the user input comprises a second input, in response to which the processor does not perform the action, the second input also comprising the common initial input.

The processor may be additionally configured to detect if the second input comprises a second additional input after the common initial input, wherein the first additional input and the second additional input are different.

The processor may be additionally configured to determine whether completion of the first input has occurred and perform the action only if completion of the first input has occurred.

The processor may be additionally configured to generate the display data in such a way that the display object is caused to appear on the display device as the common initial input is being detected, wherein the rate at which the display object appears is faster than the rate of detection of the common initial input. The display object may representative of one or more of an extent of completion of the common initial input; an extent of completion of the first input or further user input required for the processor to determine that the user input comprises the first input.

The processor may be configured to perform an action corresponding to selection of media content and additionally to output the media content. In this case, the display object may be representative of the media content.

The user interface of the device may be a touchscreen interface, the user input comprise a swipe gesture across the touchscreen interface, and the processor may be configured to perform an action comprising modifying a current output of media content, for example, by pausing output of the media content.

In a sixth aspect, there is provided a device for generating display data, the device comprising:

an input interface for detecting user input, the user input comprising a first input; and a processor in communication with the input interface, the processor being configured to: generate display data comprising a display object for display by a display device, wherein the display object is representative of content that will subsequently be output on completion of the user input; and output the display data on the display device whilst a common initial input of the first input is being detected in such a way that the display object is caused to appear on the display device as the user input is being performed wherein the rate at which the display object appears is different to the rate of detection of the user input. The device may be an electronic device as described further below.

In a seventh aspect, there is provided a device comprising a touchscreen interface configured to detect user input, the user input comprising a swipe gesture across the touchscreen interface; and a processor configured to cause an output of media content; and to cause a first modification of the output of the media content responsive to the user input. The device may be an electronic device as described further below.

The processor may be configured to detect user input comprising a vertical swipe gesture across the touchscreen interface in a first direction.

The processor may be further configured to detect second user input via the input interface, the second user input comprising a vertical swipe gesture across the touchscreen interface in a second direction opposite to the first direction; and the processor may perform the reverse of the first modification in response to the second user input detected. In one example, the first modification comprises pausing output of the media content.

This disclosure below is a description of one or more exemplary embodiments which are not intended to be limiting on the scope of the appended claims.

Reference is made to FIG. 1 which illustrates an exemplary electronic device 201 which is usable in accordance with the disclosure below. An electronic device 201 such as the electronic device 201 of FIG. 1 is configured to generate a user-controllable interface on a built-in display or on a remote, external display device, or on a built-in display and on a remote, external display device. In the context of this disclosure, the term "remote" means a display screen which is not built-in to the electronic device 201 with which the electronic device 201 communicates via a physical wired connection or via a wireless connection.

It will be appreciated that, in other embodiments, some of the features, systems or subsystems of the electronic device 201 discussed below with reference to FIG. 1 may be omitted from electronic devices 201 which are intended to perform solely operations in relation to the generation and output of display data and the modification of media content output.

In the illustrated exemplary embodiment, the electronic device 201 is a communication device and, more particularly, is a mobile communication device having data and voice communication capabilities, and the capability to communicate with other computer systems; for example, via the Internet. It will be appreciated that the electronic device 201 may take other forms, including any one of the forms listed below. Depending on the functionality provided by the electronic device 201, in certain exemplary embodiments, the electronic device 201 is a multiple-mode communication device configured for both data and voice communication, a mobile telephone, such as a smartphone, a wearable computer such as a watch, a tablet computer, a personal digital assistant (PDA), or a computer system such as a notebook, laptop or desktop system. The electronic device 201 may take other forms apart from those specifically listed above. The electronic device 201 may also be referred to as a mobile communications device, a communication device, a mobile device and, in some cases, as a device. In the context of this disclosure, the term "mobile" means the device is of a size or weight which makes it readily portable by a single individual, e.g. of a weight less than 5, 4, 3, 2, 1, 0.5, 0.4, 0.3, 0.2 or 0.1 kilograms, or of a volume less than 15,000, 10,000, 5,000, 4,000, 3,000, 2,000, 1,000, 500, 400, 300, 200, 100, 90, 80, 70, 60, 50, 40, 30, 20, 10 or 5 cubic centimetres. As such, the device 201 may be portable in a bag, or clothing pocket.

The electronic device 201 includes a controller including a processor 240 (such as a microprocessor) which controls the operation of the electronic device 201. In certain electronic devices, more than one processor is provided, with each processor in communication with each other and configured to perform operations in parallel, so that they together control the overall operation of the electronic device. The processor 240 interacts with device subsystems, such as a wireless communication subsystem 211 for exchanging radio frequency signals with a wireless network 101 to perform communication functions. The processor 240 is communicably coupled with additional device subsystems including one or more output interfaces 205 (such as one or more of: a display 204, a speaker 256, electromagnetic (EM) radiation source 257), one or more input interfaces 206 (such as one or more of: a camera 253, microphone 258, keyboard (not shown), control buttons (not shown), a navigational input device (not shown), a touch-sensitive overlay (not shown)) associated with a touchscreen 204, an orientation subsystem 249, memory (such as flash memory 244, random access memory (RAM) 246, read only memory (ROM) 248, etc.), auxiliary input/output (I/O) subsystems 250, a data port 252 (which may be a serial data port, such as a Universal Serial Bus (USB) data port), an external video output port 254, a near field communications (NFC) subsystem 265, a short-range communication subsystem 262, a clock subsystem 266, a battery interface 236, and other device subsystems generally designated as 264. Some of the subsystems shown in FIG. 1 perform communication-related functions, whereas other subsystems may provide "resident" or on-device functions.

The electronic device 201 stores data 227 in an erasable persistent memory, which in one exemplary embodiment is the flash memory 244. In various exemplary embodiments, the data 227 includes service data including information used by the electronic device 201 to establish and maintain communication with the wireless network 101. The data 227 may also include user application data such as email messages, address book and contact information, calendar and schedule information, notepad documents, presentation documents and information, word processor documents and information, spread sheet documents and information; desktop publishing documents and information, database files and information; image files, video files, audio files, internet web pages, and other commonly stored user information stored on the electronic device 201 by its user, and other data. The data may also include program application data such as functions, controls and interfaces from an application such as an email application, an address book application, a calendar application, a notepad application, a presentation application, a word processor application, a spread sheet application, a desktop publishing application, a database application, a media application such as a picture viewer, a video player or an audio player, and a web browser. The data 227 stored in the persistent memory (e.g. flash memory 244) of the electronic device 201 may be organized, at least partially, into one or more databases or data stores. The databases or data stores may contain data items of the same data type or associated with the same application. For example, email messages, contact records, and task items may be stored in individual databases within the device memory.

The electronic device 201 includes a clock subsystem or module 266 comprising a system clock configured to measure system time. In one example, the system clock comprises its own alternate power source. The system clock provides an indicator of a current time value, the system time, represented as a year/month/day/hour/minute/second/milliseconds value. In other examples, the clock subsystem 266 additionally or alternatively provides an indicator of the current time value represented as a count of the number of ticks of known duration since a particular epoch.

The clock subsystem 266, the communication subsystem 211, the NFC subsystem, 265, the short-range wireless communications subsystem 262, and the battery interface 236 together form a status report subsystem 268 which is configured to provide an indicator of the operating status of the device.

The display 204 receives display data generated by the processor 240, such that the display 204 displays certain application data stored as a segment of the data 227 from the memory (any of the flash memory 244, random access memory (RAM) 246, read only memory (ROM) 248) in a predetermined way on display screen (not shown) of the display 204, according to the processing performed by the processor 240.

In certain exemplary embodiments, the external video output port 254 is integrated with the data port 252. The external video output port 254 is configured to connect the electronic device 201 via a wired connection (e.g. video graphics array (VGA), digital visual interface (DVI) or high definition multimedia interface (HDMI)) to an external (or remote) display device 290 which is separate and remote from the electronic device 201 and its display 204. The processor 240 outputs external display data generated by the processor 240 via the external video output port 254, such that the external display device 290 can display application data from the memory module in a predetermined way on an external display screen (not shown) of the external display device 290. The processor 240 may also communicate the external display data to the external display device 290 in a similar fashion over a wireless communications path.

At any given time, the display data and the external display data generated by the processor 240 may be identical or similar for a predetermined period of time, but may also differ for a predetermined period of time, with the processor 240 controlling whether the display data and the external display data are identical or differ based on input from one or more of the input interfaces 206. In this context, the word "identical" means that both sets of data comprise similar content so as to generate an identical or substantially similar display at substantially the same time on both the external display device 290 and the display 204. In this context, the word "differ" means that the external display data and display data are not identical; this is to say that these data may (but not necessarily) include identical elements of data, for example representative of the same application data, but the external display data and display data are not wholly identical. Hence, the display on both the external display device 290 and the display 204 are not wholly identical, although similar or identical individual items of content based on the application data may be displayed on both the external display device 290 and the display 204.

In at least some exemplary embodiments, the electronic device 201 includes a touchscreen which acts as both an input interface 206 (e.g. touch-sensitive overlay) and an output interface 205 (i.e. display). The touchscreen may be constructed using a touch-sensitive input surface which is connected to an electronic controller and which overlays the display 204. The touch-sensitive overlay and the electronic controller provide a touch-sensitive input interface 206 and the processor 240 interacts with the touch-sensitive overlay via the electronic controller.

As discussed in detail below with respect to FIGS. 5-8, the processor 240 is in communication with the memory and the touch-sensitive input interface 206 to detect user input via the input interface 206. The processor 240 then generates or updates display data comprising a display object for display by the display device 204 in accordance with the user input. The display object may be representative of an action that will subsequently be performed by the processor 240 on continuation of the user input. Additionally or alternatively, the display object may be representative of content that will be output on continuation of the user input. The processor 240 then outputs the display data for display on the display device 204. Additionally or alternatively, the processor 240 may modify a current output of media in accordance with user input detected via the touchscreen interface 206. In an example, the user input comprises a swipe gesture across the touchscreen interface 206.

In at least some exemplary embodiments, the touch-sensitive overlay has a touch-sensitive input surface which is larger than the display 204. For example, in at least some exemplary embodiments, the touch-sensitive overlay may extend overtop of a frame (not shown) which surrounds the display 204. In such exemplary embodiments, the frame (not shown) may be referred to as an active frame since it is capable of acting as an input interface 206. In at least some exemplary embodiments, the touch-sensitive overlay may extend to the sides of the electronic device 201.

As noted above, in some exemplary embodiments, the electronic device 201 includes a communication subsystem 211 which allows the electronic device 201 to communicate over a wireless network 101. The communication subsystem 211 includes a receiver 212, a transmitter 213, and associated components, such as one or more antenna elements 214 and 215, local oscillators (LOs) 216, and a processing module such as a digital signal processor (DSP) 217 which is in communication with the processor 240. The antenna elements 214 and 215 may be embedded or internal to the electronic device 201 and a single antenna may be shared by both receiver and transmitter. The particular design of the wireless communication subsystem 211 depends on the wireless network 101 in which electronic device 201 is intended to operate.

In at least some exemplary embodiments, the electronic device 201 communicates with any one of a plurality of fixed transceiver base stations of the wireless network 101 within its geographic coverage area. The electronic device 201 may send and receive communication signals over the wireless network 101 after the required network registration or activation procedures have been completed. Signals received by the antenna 214 through the wireless network 101 are input to the receiver 212, which may perform such common receiver functions as signal amplification, frequency down conversion, filtering, channel selection, etc., as well as analog-to-digital (A/D) conversion. A/D conversion of a received signal allows more complex communication functions such as demodulation and decoding to be performed in the DSP 217. In a similar manner, signals to be transmitted are processed, including modulation and encoding, for example, by the DSP 217. These DSP-processed signals are input to the transmitter 213 for digital-to-analog (D/A) conversion, frequency up conversion, filtering, amplification, and transmission to the wireless network 101 via the antenna 215. The DSP 217 not only processes communication signals, but may also provide for receiver and transmitter control. For example, the gains applied to communication signals in the receiver 212 and the transmitter 213 may be adaptively controlled through automatic gain control algorithms implemented in the DSP 217.

In some exemplary embodiments, the auxiliary input/output (I/O) subsystems 250 include an external communication link or interface; for example, an Ethernet connection. The electronic device 201 may include other wireless communication interfaces for communicating with other types of wireless networks; for example, a wireless network such as an orthogonal frequency division multiplexed (OFDM) network. The auxiliary I/O subsystems 250 may include a vibrator for providing vibratory notifications in response to various events on the electronic device 201 such as receipt of an electronic communication or incoming phone call, or for other purposes such as haptic feedback (touch feedback).

In some exemplary embodiments, the electronic device 201 also includes a removable memory module 230 (typically including flash memory, such as a removable memory card) and a memory interface 232. Network access may be associated with a subscriber or user of the electronic device 201 via the memory module 230, which may be a Subscriber Identity Module (SIM) card for use in a GSM network or other type of memory card for use in the relevant wireless network type. The memory module 230 is inserted in or connected to the memory card interface 232 of the electronic device 201 in order to operate in conjunction with the wireless network 101.

The data port 252 may be used for synchronization with a user's host computer system (not shown). The data port 252 enables a user to set preferences through an external device or software application and extends the capabilities of the electronic device 201 by providing for information or software downloads to the electronic device 201 other than through the wireless network 101. The alternate download path may for example, be used to load an encryption key onto the electronic device 201 through a direct, reliable and trusted connection to thereby provide secure device communication.

In at least some exemplary embodiments, the electronic device 201 also includes a device orientation subsystem 249 including at least one orientation sensor 251 which is connected to the processor 240 and which is controlled by one or a combination of a monitoring circuit and operating software. The orientation sensor 251 detects the orientation of the device 201 or information from which the orientation of the device 201 can be determined, such as acceleration. In some exemplary embodiments, the orientation sensor 251 is an accelerometer, such as a three-axis accelerometer. An accelerometer is a sensor which converts acceleration from motion (e.g. movement of the device 201 or a portion thereof due to the strike force) and gravity which are detected by a sensing element into an electrical signal (producing a corresponding change in output). Accelerometers may be available in one, two or three axis configurations. Higher order axis configurations are also possible. Accelerometers may produce digital or analog output signals depending on the type of accelerometer.

An orientation sensor 251 may generate orientation data which specifies the orientation of the electronic device 201. The orientation data, in at least some exemplary embodiments, specifies the orientation of the device 201 relative to the gravitational field of the earth. Additionally or alternatively, the orientation sensor 251 may generate orientation data which specifies the orientation of the device relative to known locations or fixtures in a communication network.

In some exemplary embodiments, the orientation subsystem 249 includes other orientation sensors 251, instead of or in addition to accelerometers. For example, in various exemplary embodiments, the orientation subsystem 249 may include a gravity sensor, a gyroscope, a tilt sensor, an electronic compass or other suitable sensor, or combinations thereof. In some exemplary embodiments, the device orientation subsystem 249 may include two or more orientation sensors 251 such as an accelerometer and an electronic compass.

The electronic device 201, in at least some exemplary embodiments, includes a Near-Field Communication (NFC) subsystem 265. The NFC subsystem 265 is configured to communicate with other electronic devices 201 or tags, using an NFC communications protocol. NFC is a set of short-range wireless technologies which typically require a distance of 4 cm or less for communications. The NFC subsystem 265 may include an NFC chip and an NFC antenna. In such an embodiment, the orientation sensor 251 may generate data which specifies a distance between the electronic device 201 and an NFC transceiver.

The electronic device 201 includes a microphone or one or more speakers. In at least some exemplary embodiments, an electronic device 201 includes a plurality of speakers 256. For example, in some exemplary embodiments, the electronic device 201 includes two or more speakers 256. The two or more speakers 256 may, for example, be disposed in spaced relation to one another. That is, in at least some exemplary embodiments, the electronic device 201 may include a first speaker and a second speaker and the first speaker and the second speaker may be spatially separated from one another within the electronic device 201. In at least some exemplary embodiments, the display 204 may be disposed between the first speaker and the second speaker of the electronic device. In such exemplary embodiments, the first speaker may be located at one side of the display 204 and the second speaker may be located at another side of the display which is opposite the side of the display where the first speaker is located. For example, the first speaker may be disposed at a left side of the display and the second speaker may be disposed at a right side of the display.

In at least some exemplary embodiments, each speaker 256 is associated with a separate audio channel. The multiple speakers may, for example, be used to provide stereophonic sound (which may also be referred to as stereo).

The electronic device 201 may also include one or more cameras 253. The one or more cameras 253 may be capable of capturing images in the form of still photographs or motion video.

In at least some exemplary embodiments, the electronic device 201 includes a front facing camera 253. A front facing camera is a camera which is generally located on a front face of the electronic device 201. The front face is typically the face on which a display 204 is mounted. That is, the display 204 is configured to display content which may be viewed from a side of the electronic device 201 where the camera 253 is directed. The front facing camera 253 may be located anywhere on the front surface of the electronic device; for example, the camera 253 may be located above or below the display 204. The camera 253 may be a fixed position camera which is not movable relative to the display 204 of the electronic device 201 or the housing of the electronic device 201. In such exemplary embodiments, the direction of capture of the camera is always predictable relative to the display 204 or the housing. In at least some exemplary embodiments, the camera may be provided in a central location relative to the display 204 to facilitate image acquisition of a face.

In at least some exemplary embodiments, the electronic device 201 includes an electromagnetic (EM) radiation source 257. In at least some exemplary embodiments, the EM radiation source 257 is configured to emit electromagnetic radiation from the side of the electronic device which is associated with a camera 253 of that electronic device 201. For example, where the camera is a front facing camera 253, the electronic device 201 may be configured to emit electromagnetic radiation from the front face of the electronic device 201. That is, in at least some exemplary embodiments, the electromagnetic radiation source 257 is configured to emit radiation in a direction which may visible by the camera. That is, the camera 253 and the electromagnetic radiation source 257 may be disposed on the electronic device 201 so that electromagnetic radiation emitted by the electromagnetic radiation source 257 is visible in images detected by the camera.

In some exemplary embodiments, the electromagnetic radiation source 257 is an infrared (IR) radiation source which is configured to emit infrared radiation. In at least some exemplary embodiments, the electromagnetic radiation source 257 may be configured to emit radiation which is not part of the visible spectrum. The camera 253 may be a camera which is configured to capture radiation of the type emitted by the electromagnetic radiation source 257. Accordingly, in at least some exemplary embodiments, the camera 253 is configured to capture at least some electromagnetic radiation which is not in the visible spectrum.

In some exemplary embodiments, the electronic device 201 is provided with a service routing application programming interface (API) which provides an application with the ability to route traffic through a serial data (i.e., USB) or Bluetooth® (Bluetooth® is a registered trademark of Bluetooth SIG, Inc.) connection to a host computer system using standard connectivity protocols. When a user connects their electronic device 201 to the host computer system via a USB cable or Bluetooth® connection, traffic that was destined for the wireless network 101 is automatically routed to the electronic device 201 using the USB cable or Bluetooth® connection. Similarly, any traffic destined for the wireless network 101 is automatically sent over the USB cable Bluetooth® connection to the host computer system for processing.

The electronic device 201 also includes a battery 238 as a power source, which is typically one or more rechargeable batteries that may be charged for example, through charging circuitry coupled to a battery interface 236 such as the data port 252. The battery 238 provides electrical power to at least some of the electrical circuitry in the electronic device 201, and the battery interface 236 provides a mechanical and electrical connection for the battery 238. The battery interface 236 is coupled to a regulator (not shown) which provides power V+ to the circuitry of the electronic device 201.

The electronic device 201 includes a short-range communication subsystem 262 which provides for wireless communication between the electronic device 201 and other electronic devices 201. In at least some exemplary embodiments, the short-range communication subsystem 262 is a wireless bus protocol compliant communication mechanism such as a Bluetooth® communication module to provide for communication with similarly-enabled systems and devices.

Any one or more of the communication subsystem 211, the NFC subsystem 265 and the short-range wireless communications subsystem 262 serves as a "communication subsystem" which is configured to provide an indicator of the number of incoming messages being received by the electronic device 201. The incoming messages may be emails, messages received via a social networking website, SMS (short message service) messages, or telephone calls, for example.

The electronic device 201 is, in some exemplary embodiments, a mobile communication device which may provide two principal modes of communication: a data communication mode and a voice communication mode. In the data communication mode, a received data signal such as a text message, an email message, or Web page download will be processed by the communication subsystem 211 and input to the processor 240 for further processing. For example, a downloaded Web page may be further processed by a browser application or an email message may be processed by an email messaging application and output to the display 204. A user of the electronic device 201 can compose data items, such as email messages; for example, using the input devices in conjunction with the display 204. These composed items may be transmitted through the communication subsystem 211 over the wireless network 101.

In the voice communication mode, the electronic device 201 provides telephony functions and operates as a typical cellular phone. The overall operation is similar, except that the received signals would be output to the speaker 256 and signals for transmission would be generated by a transducer such as the microphone 258. The telephony functions are provided by a combination of software/firmware (i.e., a voice communication module) and hardware (i.e., the microphone 258, the speaker 256 and input interfaces 206). Alternative voice or audio I/O subsystems, such as a voice message recording subsystem, may also be implemented on the electronic device 201. Although voice or audio signal output is typically accomplished primarily through the speaker 256, the display screen 204 may also be used to provide an indication of the identity of a calling party, duration of a voice call, or other voice call related information.

The processor 240 operates under stored program control and executes software modules 221 stored in memory such as persistent memory; for example, in the flash memory 244. As illustrated in FIG. 1, the software modules 221 include operating system software 223 and other software applications 225 such as a media player module 260. In the exemplary embodiment of FIG. 1, the media player module 260 is implemented as a stand-alone application 225. However, in other exemplary embodiments, the presentation module 260 could be implemented as part of the operating system 223 or other applications 225.

As discussed above, electronic devices 201 which are configured to perform operations in relation to a communications log may take a variety of forms. In at least some exemplary embodiments, one or more of the electronic devices which are configured to perform operations in relation to the presentation module 260 are a smart phone or a tablet computer.

Figure 2:
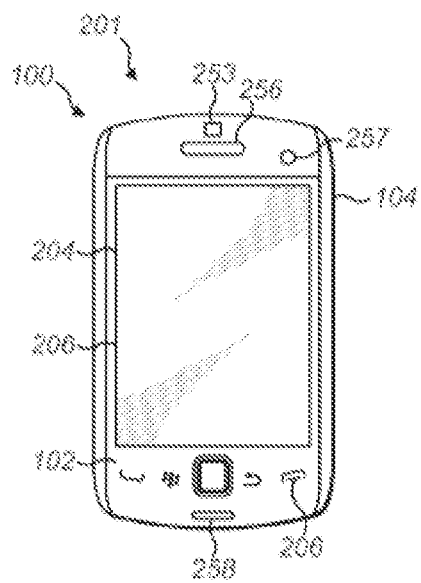
FIG. 2 is a plan view of the upper external side of one exemplary electronic device usable by an end-user in some embodiments.

Referring now to FIG. 2, a front view of an exemplary electronic device 201 which in one example may be a smartphone 100 is illustrated. The smartphone 100 is a mobile phone which offers more advanced computing capability than a basic non-smartphone cellular phone. For example, the smartphone 100 may have the ability to run third party applications which are stored on the smartphone.

The smartphone 100 includes all of the components discussed above with reference to FIG. 1, or a subset of those components. The smartphone 100 includes a housing 104 which houses at least some of the components discussed above with reference to FIG. 1.

In the exemplary embodiment, the smartphone includes a display 204, which may be a touchscreen which acts as an input interface 206. The display 204 is disposed within the smartphone 100 so that it is viewable at a front side 102 of the smartphone 100. That is, a viewable side of the display 204 is disposed on the front side 102 of the smartphone. In the exemplary embodiment illustrated, the display 204 is framed by the housing 104.

The example smartphone 100 also includes other input interfaces 206 such as one or more buttons, keys or navigational input mechanisms. In the example illustrated, at least some of these additional input interfaces 206 are disposed for actuation at a front side 102 of the smartphone.

The example smartphone also includes a speaker 256. In the exemplary embodiment illustrated, the smartphone includes a single speaker 256 which is disposed vertically above the display 204 when the smartphone 100 is held in a portrait orientation where its height is longer than its width. The speaker 256 may be disposed on the front face of the smartphone 100.

While the example smartphone 100 of FIG. 2 includes a single speaker 256, in other exemplary embodiments, the smartphone 100 may include a greater number of speakers 256. For example, in at least some exemplary embodiments, the smartphone 100 may include a second speaker 256 which is disposed vertically below the display 204 when the smartphone is held in a portrait orientation where its height is longer than its width (i.e. the orientation illustrated in FIG. 2).

The example smartphone 100 also includes a microphone 258. In the example illustrated, the microphone 258 is vertically disposed below the display 204 when the smartphone is held in the portrait orientation. The microphone 258 and at least one speaker 256 may be arranged so that the microphone is in close proximity to a user's mouth and the speaker 256 is in close proximity to a users ear when the user holds the phone to their face to converse on the smartphone.

The example smartphone 100 also includes a front facing camera 253 which may be located vertically above the display 204 when the smartphone 100 is held in a portrait orientation where its height is longer than its width. The front facing camera 253 is located so that it may capture images of objects which are located in front of or surrounding the front side of the smartphone 100.

The example smartphone 100 also includes an electromagnetic radiation source 257. The electromagnetic radiation source 257 is disposed on the front side 102 of the smartphone 100. In this orientation, electromagnetic radiation which is produced by the electromagnetic radiation source 257 may be projected onto objects which are located in front of or surrounding the front side of the smartphone 100. Such electromagnetic radiation (or the projection of electromagnetic radiation onto objects) may be captured on images detected by the camera 253.

Figure 3:
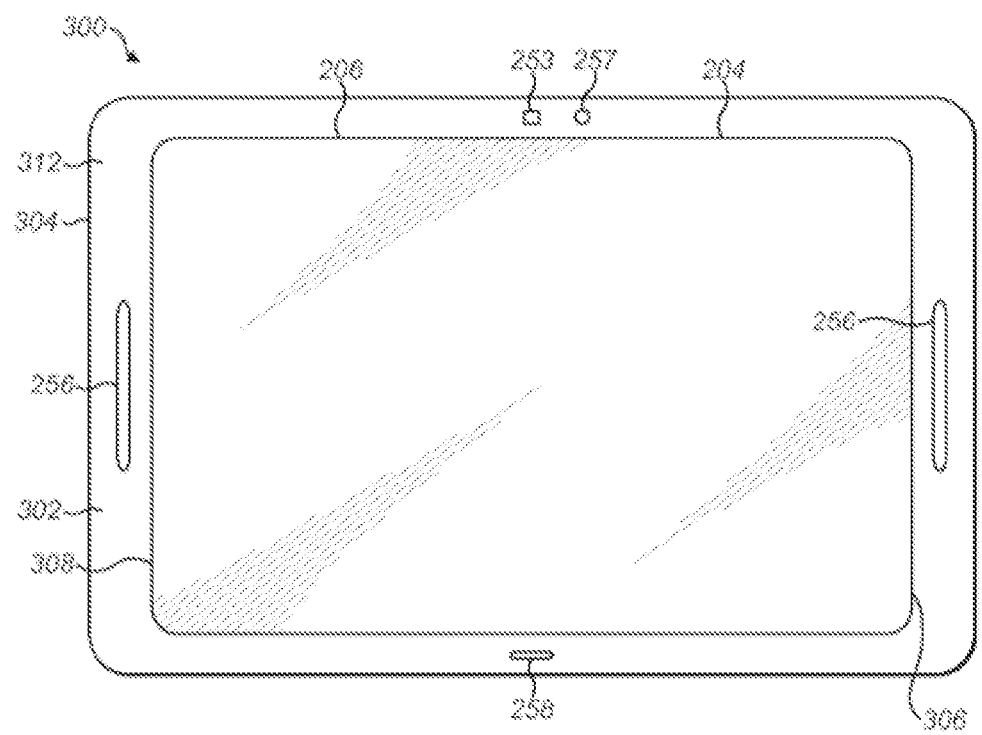
FIG. 3 is a plan view of the upper external side of one alternative exemplary electronic device usable by an end-user in some embodiments.

Referring now to FIG. 3, a front view of an example electronic device 201, which in one example may be a tablet computer 300, is illustrated. The tablet computer 300 may include the components discussed above with reference to FIG. 1 or a subset of those components. The tablet computer 300 includes a housing 304 which houses at least some of the components discussed above with reference to FIG. 1.

The tablet computer 300 includes a display 204, which may be a touchscreen which acts as an input interface 206. The display 204 is disposed within the tablet computer 300 so that it is viewable at a front side 302 of the tablet computer 300. That is, a viewable side of the display 204 is disposed on the front side 302 of the tablet computer 300. In the exemplary embodiment illustrated, the display 204 is framed by the housing 304.

A frame 312 surrounds the display 204. The frame 312 is portion of the housing 304 which provides a border around the display 204. In at least some exemplary embodiments, the frame 312 is an active frame 312. That is, the frame has a touch sensitive overlay which allows the electronic device 201 to detect a touch applied to the frame thus allowing the frame 312 to act as an input interface 206 (FIG. 1).

The exemplary tablet computer 300 includes a plurality of speakers 256. In the exemplary embodiment illustrated, the tablet includes two speakers 256. The two speakers 256 are disposed on opposing sides of the display 204. More particularly, when the tablet computer 300 is held in a landscape orientation (such as the orientation illustrated in FIG. 3) where its width is longer than its height, one of the two speakers is disposed on a right side 306 of the display 204 and one of the speakers is disposed on the left side 308 of the display 204.

Both speakers 256 are disposed on the front side 302 of the tablet computer 300.

The exemplary tablet computer 300 also includes a microphone 258. In the example illustrated, the microphone 258 is vertically disposed below the display 204 when the tablet computer is held in the landscape orientation illustrated in FIG. 3. The microphone 258 may be located in other locations in other exemplary embodiments.

The exemplary tablet computer 300 also includes a front facing camera 253 which may be located vertically above the display 204 when the tablet computer 300 is held in a landscape orientation (i.e. the orientation of FIG. 3). The front facing camera 253 is located so that it may capture images of objects which are located in front of or surrounding the front side of the tablet computer 300.

The example tablet computer 300 also includes an electromagnetic radiation source 257. The electromagnetic radiation source 257 is disposed on the front side 304 of the tablet computer 300. In this orientation, electromagnetic radiation which is produced by the electromagnetic radiation source 257 may be projected onto objects which are located in front of or surrounding the front side 302 of the tablet computer 300. Such electromagnetic radiation (or the projection of electromagnetic radiation onto objects) may be captured on images detected by the camera 253.

The tablet computer 300 may have the ability to run third party applications which are stored on the tablet computer.

The electronic device 201, which may be tablet computer 300, is usable by an end-user to send and receive communications using electronic communication services supported by a service provider.

The end-user of an electronic device 201 may send and receive communications with different entities using different electronic communication services. Those services may or may not be accessible using one or more particular electronic devices. For example, a communication source of an end-users text messages sent and received by an end-user using a particular electronic device 201 having a particular memory module 230, such as a USIM, may be accessible using that device 201, but those text messages may not be accessible using another device having a different memory module. Other electronic communication sources, such as a web-based email account, may be accessible via a web-site using a browser on any internet-enabled electronic device.

Figure 4:
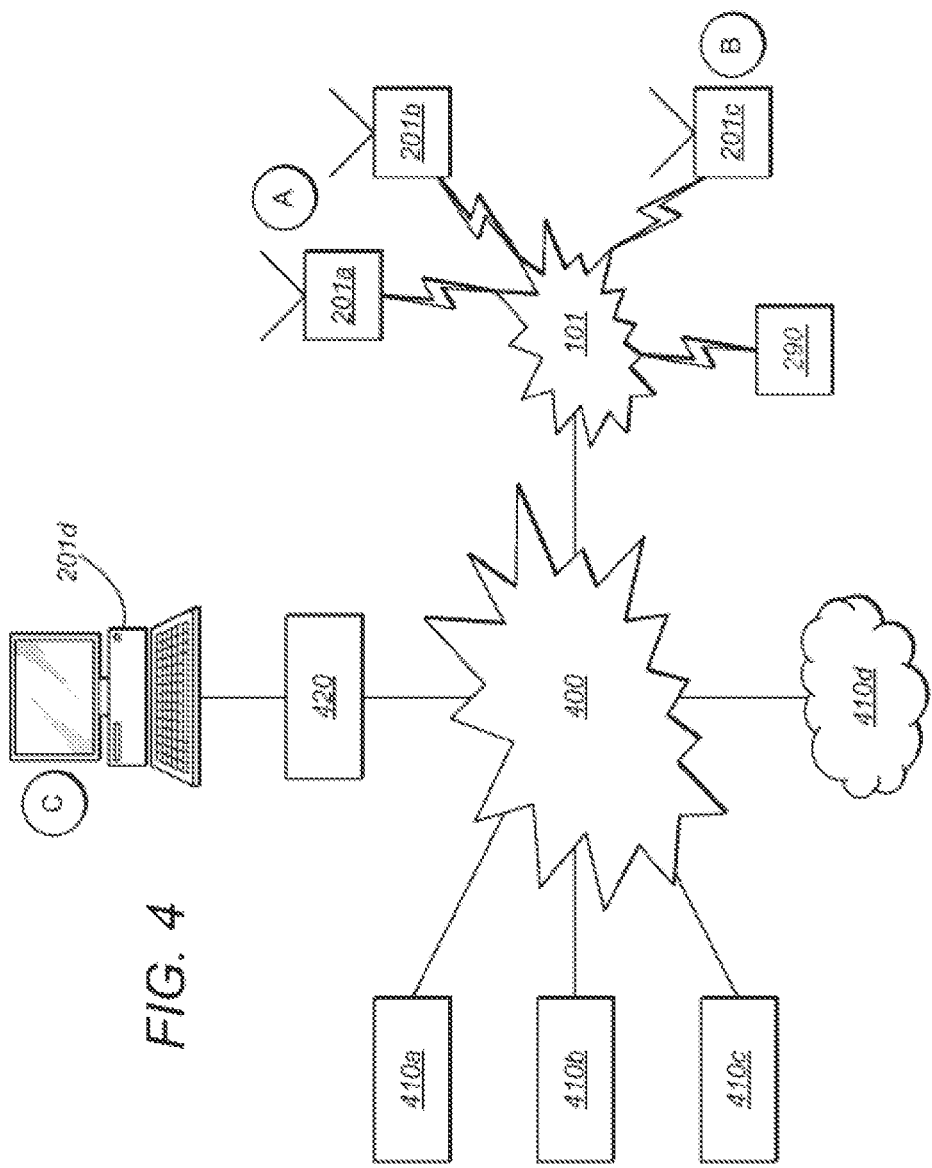
FIG. 4 is a schematic diagram of an exemplary system in which the aforementioned electronic devices can be employed in some exemplary embodiments.

FIG. 4 shows a system of networked apparatus by which electronic communications can be sent and received using multiple electronic devices 201a, 201b, 201c. Referring to FIG. 4, electronic devices 201a, 201b and 201c are connected to wireless network 101 to perform voice and data communications, and to transmit data to an external display device 290 residing on the wireless network. Wireless network 101 is also connected to the Internet 400. Electronic device 201a may be a tablet computer similar to tablet computer 300 described in FIG. 2 above. Electronic devices 201b and 201c may be smartphones. Electronic device 201d is a computing device such as a notebook, laptop or desktop, which is connected by a wired broadband connection to Local Area Network 420, and which is also connected to the Internet 400. Electronic devices 201a, b, c, d may access the Internet 400 to perform data communications therewith.

Servers 410a, 410b. 410c and 410d are also connected to the Internet 400 and one or more of them may individually or together support electronic communications services available to end-users of electronic devices 201a, 201b, 201c and 201d, enabling them to send and receive electronic communications. Servers 410*a*, 410*b*, 410*c* and 410*d* may be web servers or communications servers, such as email servers.

Other servers and services may of course be provided allowing users of electronic devices 201*a*, 201*b*, 201*c* and 201*d* to send and receive electronic communications by, for example, Voice over IP phone calls, video IP calls, video chat, group video chat, blogs, file transfers, instant messaging, and feeds.

Wireless network 101 may also support electronic communications without using Internet 400. For example, a user of smart phone 201*b* may use wireless network 101 to make telephony calls, video calls, send text messages, send multimedia messages, and send instant messages to smart phone 201*c*, and to display application data on a display screen of the external display device 290, or control the display of application data.

The example shown in FIG. 4 is intended to be non-limiting and additional network infrastructure may of course be provided, such as a Public Switched Telephone Network (not shown), which may be used, for example, to make telephony calls using smartphone 201*b* to a wired phone (not shown).

To explain exemplary modes of operation, reference will now be made to FIGS. 5 to 8.

Figure 5:
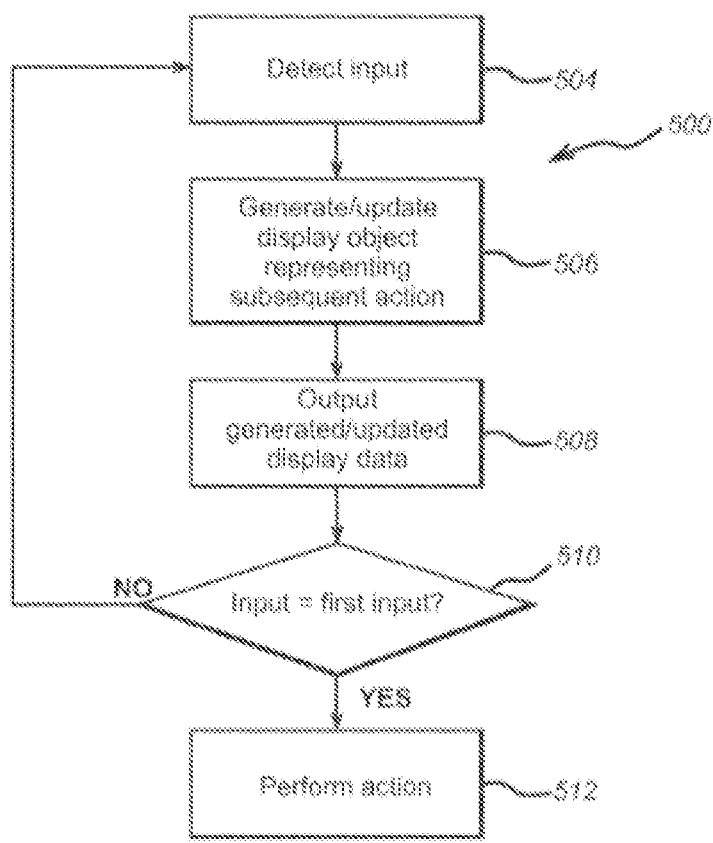
FIG. 5 is a flow diagram showing a method for generating display data.

FIG. 5 depicts a flow chart depicting a method 500 performed by the processor 240 for generating the display data which is output on the display screen 204. At block 504, the input interface 206 detects or obtains an input. The input may comprise any suitable input for issuing a command to the processor 240 via the input interface 206. For example, the input interface 206 may comprise a microphone and the input comprise a voice input; the input interface 206 may be an orientation sensor 251 and the input comprise a location of the device 201 relative to an NFC transceiver; the input interface 206 may be an orientation sensor 251 comprising an accelerometer and the input comprise movement of the device 201 by shaking.

The input interface 206 may also comprise the touchscreen, in which case the electronic device 201 may be referred to as a 'multi-touch device'. The input detected by the touchscreen interface may comprise any suitable user touch-based input. For example, the input may comprise a gesture input such as a tap, a multi-tap, a long press, a swipe or scroll or slide, a pan, a flick, a multi-swipe, a multi-finger tap, a multi-finger scroll or swipe, a pinch, a two-hand pinch, a spread, a two-hand spread, a rotation, a two-hand rotation, a slide and rotation, a multi-direction slide, a multi-finger slide and rotation, a multi-finger slide, etc. It will be appreciated that the gesture input may comprise a sequence of input elements or stages performed within a specified or predetermined time frame, for example, a three-tap gesture in which each tap comprises an element (or a sub-input, a phase or a stage) of the input and the three taps are performed within a time frame that enables the processor 240 to detect the taps as elements of a single input. Additionally or alternatively, an input may comprise removing a point of contact, e.g. a finger or stylus, from the touchscreen interface.

Although many examples described herein refer to a gesture detected by a touch-sensitive display, other methods of gesture detection may be utilized. For example, a gesture may be a generalized trajectory description characterized as a sequence of 3D points in time, and as such many different sensors may be utilized to detect such a gesture. The gesture may be performed by moving a portable electronic device or moving one or more body parts, such as fingers or thumbs as a 3D spatial gesture. For example, sensors, such as an accelerometer/gyroscope, or proximity sensors, or time-of-flight cameras may detect such gestures. Gesture recognition and detection techniques of this type are known.

An accelerometer or gyroscope may be utilized to detect 3D spatial gestures. A sequence of acceleration values may be detected in the different spatial dimensions as a function of time and constitute trajectory information that can be recognized as a gesture. For example, a quick flick or tilt of the portable electronic device are examples of detectable gestures. A 3D spatial gesture includes a continuous movement, a sequence of movements, and a series of continuous movements or sequences of movements. Proximity sensors, optical sensors, and/or cameras may be utilized to detect 3D spatial gestures comprising motion of objects spaced from the device.

A gesture input is different to input of a command by manipulation of a control component presented on the screen because a gesture input can be performed at any location within the display screen (or a large area of the display screen) in contrast to a single contact point for a user finger or input stylus on a corresponding control element. In order to input a command using a control component, the user must contact the screen at a specific location corresponding to that component. For example, in order to change an output volume using a volume control, the user must select the volume control by touching the location at which the volume control is displayed and moving the displayed control element by a desired amount through movement of the user's finger across the screen. Such user input must therefore be precisely controlled in order to use control elements to input commands. Gesture-based inputs, on the other hand, do not require the same precise control as they are not tied to a specific location on the screen. Instead, a user wishing to, e.g., scroll through a list of media content can do so by performing a swipe gesture at any location within a media-player display.

At block 506, the processor 240 generates or updates the display data comprising a display object for display by the display device 204. The display object is representative of an action that will be performed by the processor 240 if the input is continued or completed, i.e. the action that will subsequently be performed by the processor 240 only if the input is determined to be completed or continued beyond a threshold extent or sufficiently for the processor to determine that the input comprises a command to perform the action. Up to this point, the processor 240 does not perform the action and the input is therefore undoable up until its completion and the action is not performed. This is discussed in further detail with respect to FIG. 6 below.

At block 508, the processor 240 outputs the generated or updated display data comprising the updated display object to the output interface 205.

Figure 6A:
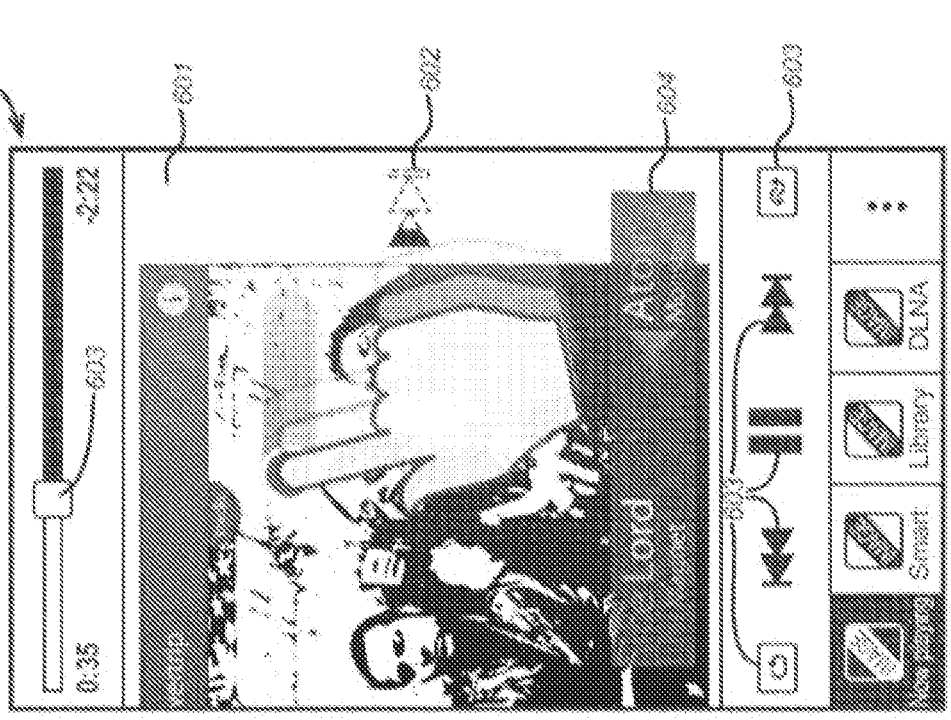
FIGS. 6A(i)-(iv) and 6B(i)-(iv) are exemplary displays showing exemplary input sequences.

At block 510, the processor 240 determines whether the input detected via the interface 206 is a first input as shown in FIG. 6A(i)-(iii), or a second input as shown in FIGS. 6B(i) to (iii).

At block 512 the processor 240 performs the action only on continuation or completion of the input or on determination that the input comprises the first input. If the input is not continued, the processor 240 determines that the input comprises the second input and does not perform the action. Instead, if the input comprises the second input, processing resumes at block 504.

FIGS. 6A(i)-(iv) and 6B(i)-(iv) depict the display 204 displaying an interface 601 of a media player which is generated from the display data output by the processor 240.

A user can control or modify the media output by manipulating the control components 603. This manipulation requires the user to touch the screen at the location at which each control component is displayed. Additionally or alternatively, the user can control or modify the output of the media using gesture based inputs. As discussed in relation to FIG. 5, a gesture input may be performed at any location on the media player interface 601.

FIGS. 6A(i)-(iv) and 6B(i)-(iv) depict example sequence of inputs, the continuation (or completion) of which results in the processor 240 causing a media player to output (or play) a next track in a playlist. In particular, FIG. 6A(i) shows the display 204 for a media player application running, or outputting a current track on the electronic device 201 through the speaker 256, whilst an input is initiated by touching or making contact with the touchscreen interface 206 (e.g. with a finger or touchscreen stylus).

In FIG. 6A(ii), the input is continued by swiping (or moving or sliding) the point of contact in a horizontal motion across the touchscreen interface 206. It will be appreciated that continuation of the input may equally comprise moving the contact in a vertical or diagonal motion across the touchscreen (or a combination of the three). Additionally or alternatively, continuation of the input may comprise maintaining the contact with the touchscreen interface 206 without movement of the point of contact, or completing any of the gesture inputs discussed above with respect to block 502. Completing an input, e.g. a gesture input, means performing the input to an extent required to cause the processor to determine that an action (e.g. start playing the next track) is to be performed in response to the input.

Figure 6A:

The display object 602 is representative of the action that will be performed if the input is continued beyond the common initial phase to provide the first input. In the example of FIG. 6, the display object 602 comprises a well-known symbol representing the action of skipping (or jumping) to the subsequent track listed by the media player and outputting that track. In this case, the action that will be performed on continuation of the action will be the output of the next track in the playlist and this action is represented by the "next track" display object 602.

In addition to representing the action that the processor 240 will subsequently perform on continuation of the input, the display object 602 may also represent a current phase, stage, or degree of completion, of the input through variation of a parameter or characteristic of the display object 602. For example, the display object 602 shown in FIGS. 6A(ii) and 6B(ii) is part-filled (or part coloured-in) to represent that the contact has been moved part of the distance required to provide the first input (i.e. part of the distance required to cause the processor 240 to perform the action).

Further examples of suitable display objects include arrows, other known media player control symbols, text, egg-timer symbols, images of media content or software applications, or a number of these elements grouped together as a display object. Each display object 602 has one or more visual parameters associated with it which can be varied to show degree of completion of the input and which comprise one or more of brightness, colour, contrast, opacity, frequency, amplitude, speed, or the number or thickness of a plurality of lines (e.g. hatching).

As shown in FIG. 6A(iii), the input is completed by moving the contact to a sufficient extent to cause the processor 240 to perform the action thereby resulting in the media player outputting the subsequent track in a playlist. In this case, the display object 602 is filled-in, thereby indicating that the input has been completed. FIG. 6A(iv) depicts the output display 601 of the media player after the action corresponding to the input has been completed, i.e. the media player display depicting the track which is now being played.

FIGS. 6B(i)-(iv) show the display 204 depicting a second input in which the input is not continued to a sufficient extent to result in the processor 240 performing the action. It can be seen that the input stages depicted in FIGS. 6B(i) and 6B(ii) are respectively the same as those depicted in FIGS. 6A(i) and 6A(ii). Hence, these input stages correspond to an initial input (or initial input phase or stage) that is common to both the first and second input.

During this common initial input phase, the processor 240 is able to determine the potential action that it will perform in response to the input, i.e. the action that will subsequently be performed by the processor 240 if the input is continued to provide a first input as depicted in FIG. 6A (i.e. if the common initial input phase is followed by the phase depicted in FIG. 6A(iii)). However, during this common initial input, the processor 240 cannot yet determine whether or not this action will be performed as the common initial input may instead be followed by the phase depicted in FIG. 6B(iii).

In the example depicted in FIG. 6B(iii), the contact with the touchscreen interface 206 has not moved a sufficient distance for continuation of the input beyond the common initial phase as depicted in FIG. 6A(iv). Instead, the contact is moved back toward the location at which the contact was initially made or simply released, thereby 'undoing' or abandoning the input. In this case, the media player interface 601 returns to the original screen at FIG. 6B(iv) and the media player continues to play the current track.

Whilst the displays of FIGS. 6A(i)-(iv) and 6B(i)-(iv) relate to an input comprising a swipe across a touchscreen interface 206, analogous sequences arise for other types of input. For example, for a voice input, the common initial phase may comprise inputting a voice signal of a given intensity, with a first input type being provided if the voice input intensity continues above a threshold intensity or for a duration longer than a threshold duration, whilst a second input is provided if the voice input intensity does not surpass the intensity or duration threshold in which case, the processor 240 does not perform the action.

Similarly, in the example of an input comprising shaking the electronic device 201, if the shaking intensity continues beyond a threshold intensity or a threshold duration, the input will be the first input and the processor 240 will perform the corresponding action. Alternatively, if the shaking intensity does not continue beyond the threshold intensity the second input is provided, in which case the processor 240 does not perform the corresponding action.

As discussed, the display object 602 is progressively filled further (or coloured in) as the distance moved by the contact increases. In this way, the further movement or input required in order to cause the processor 240 to perform the relevant action is indicated (or represented or symbolised) by the display object 602. A user of the device 201 is therefore guided by the display object with respect to the input required in order to cause a desired output. Additionally, the user is guided by the display object as to whether or not it is possible to abandon the input without causing performance of the subsequent action.

FIG. 7 is a flow chart depicting a method 700 for generating display data. Block 704 of method 700 corresponds directly to block 504 of method 500.

At block 706, the processor 240 generates or updates data comprising a second type of display object 604 for display by the display device 204, wherein the display object 604 is representative of content that will subsequently be output on continuation or completion of the user input. In the examples of FIGS. 6(*i*)-(*iv*), the display object 604 is a banner displaying a title of a song that will be played if the user completes a horizontal swipe gesture. Further examples of display objects include thumbnail images or any other representation of an output on the display screen 204 or from other outputs of the device 201 that will occur in response to completion of the input.

At block 708, the processor 240 outputs the generated or updated data on the display device 204. In this case, the processor 240 causes the display object 604 to appear on the display device over time as the user input is being detected by the input interface (or during performance of the user input). Furthermore, the processor 240 causes the display object 604 to appear on the display device 204 at a different rate to the rate at which the user input is detected. For example, the processor 240 may cause the display object 604 to appear on the display device at a rate faster (or slower) than the rate at which the user input is detected via the interface. A particular example is when completion of the user input results in the processor 240 causing a media player to play a next track, in which case the display object 604 shown in the figures comprises a banner display of the title of the next track and the banner display appears on the display screen 204 at a faster rate than a rate of completion of the user input.

In the example of FIGS. 6A(i)-(iv), the display object 604 comprises the title of the song that will be played if the user completes the input. The display object 604 appears during the common initial input and is decipherable before completion of the input. Accordingly, the user is informed of the consequence of completing the input in sufficient time before completion of the input to allow the user to abandon (or undo) the input if desired. In this way, the display object provides a preview of a future operational state of the device 201 that will arise if the input is completed.

FIG. 8 is a flow chart depicting a method 800 for modifying an output of media content. At block 802 a media player application outputs media content through the output interface 205. For example, the media player application being executed by the processor 240 may play (or output) a track or a video stored in the memory 244 through the speaker 256, the display device 204 or both the speaker 256 and the display device. Alternatively, the media player application may play a track or a video stored at a remote location accessed across the network 101 through the speaker 256, the display device 204 or both the speaker 256 and the display device 204.

At block 804, the processor 240 detects a first input comprising a swipe gesture across the touchscreen interface 206. In particular, the swipe gesture may be across the media player interface 601. The swipe may be in a vertical, horizontal or diagonal direction across the touchscreen interface 206 or a gesture input comprising a multi-directional swipe gesture.

At block 806, the processor 240 modifies the current output of the media content in response to the first input detected by the touchscreen interface 206. For example, the processor 240 may pause the output of the media content, increase or decrease the output volume of the media player, cause the media player to output the next or the previous track instead of a current track, or perform any other suitable modification of the media content output. In this manner, the main functions of a media player application can be easily and efficiently controlled by a user even in situations where the user is unable to view the electronic device 201 or precisely control the input.

At block 808, the processor 240 detects a second user input comprising a swipe gesture in a direction (or directions) opposite to the first swipe gesture input. For example, if the first swipe gesture input is a vertical swipe across the touchscreen interface in an upward direction, the second swipe gesture input comprises a vertical swipe across the touchscreen interface in a downward direction.

At block 810, the processor 240 responds to the second swipe gesture by reversing the performance of the modification (or 'undoing' the modification of block 806). For example, if the processor 240 pauses output of a song in response to a downward vertical swipe gesture, the processor 240 then re-commences output of the song in response to an upward vertical swipe gesture. Similarly, if the processor 240 increases the output volume in response an upward vertical swipe gesture, the processor 240 then decreases the output volume (or returns to the original output volume) in response to a downward vertical swipe gesture.

It will be appreciated that, as discussed in relation to FIGS. 5, 6A(i)-(iv) and 6B(i)-(iv), at block 806, 808, or both, the processor 240 may only modify the media output (i.e. perform the action corresponding to the input) if the input is determined to be a first type of input as discussed in relation to FIGS. 6 A(i)-(iv) and 6B(i)-(iv).

The invention claimed is:

1. A method, comprising:
   playing, by a media player application, a video through a media player interface of a mobile device including a touchscreen;
   detecting, by the touchscreen, a first swipe gesture over the media player interface that controls the playing of the video along a first direction while the media player application is playing the video;
   in response to the first swipe gesture along the first direction, modifying the playing of the video corresponding to the first swipe gesture along the first direction;
   detecting, by the touchscreen, a second swipe gesture over the media player interface that controls the playing of the video along a second direction substantially opposite the first direction; and
   in response to the second swipe gesture over the same media player interface as the first swipe gesture and along the second direction substantially opposite the first direction, modifying the playing of the video corresponding to the second swipe gesture along the second direction, and wherein the modifying the playing of the video corresponding to the first swipe gesture along the first direction comprises pausing the playing of the video, and wherein the modifying the playing of the video corresponding to the second swipe gesture along the second direction comprises resuming the playing of the video.

2. The method of claim 1, wherein the first swipe gesture comprising a common initial input, and the method comprises: in response to detecting the common initial input, displaying a display object, wherein the display object is representative of a modification that will subsequently be performed on completion of the first swipe gesture.

3. The method of claim 2, wherein the first swipe gesture comprising an additional input, and the method comprises: in response to detecting the additional input, determining that the first swipe gesture is completed, and modifying the playing of the video corresponding to the first swipe gesture along the first direction.

4. The method of claim 1, wherein the first direction is a vertical, horizontal, or diagonal direction, and the second direction is a reverse of the vertical, horizontal, or diagonal direction.

5. The method of claim 1, wherein the video is stored in memory of the mobile device or stored at a remote location.

6. The method of claim 1, wherein the first swipe gesture is an upward vertical swipe gesture, the second swipe gesture is an downward vertical swipe gesture.

7. A terminal device, comprising:
   a touchscreen;
   a memory;
   one or more processors;
   one or more programs are stored in the memory, wherein the one or more programs, when executed by the one or more processors, cause the terminal device to:
     play, by a media player application, a video through a media player interface;
     detect a first swipe gesture over the media player interface that controls the playing of the video along a first direction while the media player application is playing the video;
     in response to the first swipe gesture along the first direction, modify the playing of the video corresponding to the first swipe gesture along the first direction;
     detect a second swipe gesture over the media player interface that controls the playing of the video along a second direction substantially opposite the first direction; and
     in response to the second swipe gesture over the same media player interface as the first swipe gesture and along the second direction substantially opposite the first direction, modify the playing of the video corresponding to the second swipe gesture along the second direction, and wherein the modifying the playing of the video corresponding to the first swipe gesture along the first direction comprises pausing the playing of the video, and wherein the modifying the playing of the video corresponding to the second swipe gesture along the second direction comprises resuming the playing of the video.

8. The terminal device of claim 7, wherein the first swipe gesture comprising a common initial input, and the one or more programs, when executed by the one or more processors, cause the terminal device to: in response to detecting the common initial input, display a display object, wherein the display object is representative of a modification that will subsequently be performed on completion of the first swipe gesture.

9. The terminal device of claim 8, wherein the first swipe gesture comprising an additional input, and the one or more programs, when executed by the one or more processors, cause the terminal device to: in response to detecting the additional input, determine that the first swipe gesture is completed, and modify the playing of the video corresponding to the first swipe gesture along the first direction.

10. The terminal device of claim 7, wherein the first direction is a vertical, horizontal, or diagonal direction, and the second direction is a reverse of the vertical, horizontal, or diagonal direction.

11. The terminal device of claim 7, wherein the video is stored in memory of the terminal device or stored at a remote location.

12. The terminal device of claim 7, wherein the first swipe gesture is an upward vertical swipe gesture, the second swipe gesture is an downward vertical swipe gesture.

13. A computer program product comprising computer-executable instructions stored on a non-transitory computer-readable medium that, when executed by one or more processors, cause a terminal device to:
    play a video through a media player interface;
    detect a first swipe gesture over the media player interface that controls the playing of the video along a first direction while the video is played;
    in response to the first swipe gesture along the first direction, modify the playing of the video corresponding to the first swipe gesture along the first direction;
    detect a second swipe gesture over the media player interface that controls the playing of the video along a second direction substantially opposite the first direction; and
    in response to the second swipe gesture over the same media player interface as the first swipe gesture and along the second direction substantially opposite the first direction, modify the playing of the video corresponding to the second swipe gesture along the second direction, and wherein the modifying the playing of the video corresponding to the first swipe gesture along the first direction comprises pausing the playing of the video, and wherein the modifying the playing of the video corresponding to the second swipe gesture along the second direction comprises resuming the playing of the video.

14. The computer program product of claim 13, wherein the first swipe gesture comprising a common initial input, and the instructions, when executed by the one or more processors, cause the terminal device to: in response to detecting the common initial input, display a display object, wherein the display object is representative of a modification that will subsequently be performed on completion of the first swipe gesture.

15. The computer program product of claim 14, wherein the first swipe gesture comprising an additional input, and the instructions, when executed by the one or more processors, cause the terminal device to: in response to detecting the additional input, determine that the first swipe gesture is completed, and modify the playing of the video corresponding to the first swipe gesture along the first direction.

16. The computer program product of claim 13, wherein the first direction is a vertical, horizontal, or diagonal direction, and the second direction is a reverse of the vertical, horizontal, or diagonal direction.

17. The computer program product of claim 13, wherein the video is stored in memory of the terminal device or stored at a remote location.

18. The terminal device of claim 13, wherein the first swipe gesture is an upward vertical swipe gesture, the second swipe gesture is an downward vertical swipe gesture.

* * * * *